Patented Aug. 31, 1926.

1,598,033

UNITED STATES PATENT OFFICE.

HARPER F. ZOLLER, OF DETROIT, MICHIGAN.

ICE CREAM AND PROCESS OF MAKING SAME.

No Drawing.    Application filed May 8, 1922. Serial No. 559,461.

This invention relates to improvements in ice cream, in the mix of which the cream is made, and in the process of making and freezing the cream.

One object of the invention is to increase the palatability of ice cream having a moderate butter fat content.

Another object of the invention is the production of an ice cream that is palatable, of high nutritive value and that more nearly approaches the approved standards for balanced rations than have prior ice creams.

Another object of the invention is to effect a close control of the possible over-run or swell of the ice cream by maintaining a suitable surface tension of the mix notwithstanding variations of its composition.

Another object of the invention is the reduction of the cost of producing ice creams of superior quality.

Other objects more or less incidental or ancillary to those stated, as well as the manner of attaining the various objects, will appear in the following description setting forth in detail the preferred procedure in practicing the invention.

The palatability of ice cream as heretofore produced has varied to a considerable extent according to the proportion of butter fat to other solids in the product. An ice cream with a relatively high fat is, other things being equal, very smooth and pleasant to the taste. An ice cream made from a mix containing 14% and upwards of butter fat would be typical of products of this latter character. However, many commercial ice creams are produced having a materially lower butter fat content, chiefly for the purpose of meeting the demand for a lower-priced product. These latter ice creams less rich in fat have been open to two chief objections, namely, that if the reduction in the amount of butter fat is not compensated by the introduction of other solids, the cream is lacking in body and food value, and, on the other hand, if the reduction in butter fat is compensated for by increase of the milk solids not fat, the product may have a satisfactory body and food value but is found on standing in cold storage to develop marked "sandiness". This sandiness has been shown to be due to the crystallizing out of the lactose in the milk solids not fat in the ice cream mix.

By my present invention I have succeeded in overcoming the difficulties referred to and am enabled to produce an ice cream with moderate butter fat content having ample body and food value, marked smoothness to the taste, and capable of retaining this latter characteristic without development of sandiness during prolonged cold storage. This result I secure by substituting for a portion of the milk solids not fat an edible alkali caseinate, preferably sodium caseinate. There has been an extensive use of the alkali caseinates in the industrial arts, but as heretofore produced such caseinates have not been suitable for food purposes for the reason that they practically invariably contain toxic substances. It is possible, however, to produce alkali caseinates that are entirely suitable for food purposes. What I term my lacto-hydric process of making alkali caseinate constitutes one method of producing an edible product of this character that is highly nutritive, readily digested, and entirely free from toxic substances, and I will here state the essential steps of that process.

Taking fresh skimmed milk I first precipitate the casein by the so-called "grain curd" process according to which preferably the milk if previously pasteurized, is heated to 93° F.–95° F., and to it hydrochloric acid (1 to 8) is added in spray form with some agitation until the milk "breaks" into a soft curd. More acid is then added slowly with sufficient stirring to form a pea-sized curd at the first appearance of pronounced red with the indicator methyl red, this being at about 4.2 p. H. in the presence of whey.

From the casein curd thus precipitated the whey is now drawn off except for about one-twentieth of the entire volume of whey, which is left on the curd to act as buffer against the strong alkali solution which is later added. It is undesirable to leave much of the whey in case the skim milk is very sour in the beginning since an excess of the whey is likely to result in an off-flavor which remains in the caseinate.

To the moist casein is then added warm water in a quantity sufficient to render the final solution of a consistency suitable for powdering by the spray method or for otherwise drying. If liquid sodium caseinate is to be produced a solution of 20% to 30% caseinate is suitable.

For alkali I prefer to use sodium hydroxide either in the form of soda ash or sodium hydroxide sticks, flakes or lumps. The hydroxide is dissolved in water to form a 5% solution which is added a little at a time to the curd suspended in the water with vigorous stirring. As the alkali is slowly added, frequent tests are made to avoid adding an excess, i. e., more than necessary to dissolve the casein. These tests are made with brom cresol purple and phenol red using .05% water solutions of these indicators. The proper amount of alkali has been added when all of the casein particles appear to be in solution and a drop of the solution on a white background shows bluish purple with brom cresol purple and shows yellow-orange with phenol red. The alkali caseinate solution meeting the test last mentioned has a hydrogen-ion concentration ranging between 6.2 p.H. and 6.8 p.H., or, in other words, is in the zone of reaction of normal fresh milk.

The caseinate solution in the final solubilizing stage may be heated with either live steam or by jacketed steam, to a temperature as high as the boiling point, if necessary. After the alkali has once soaked into the centers of the curd grains, heat facilitates the dissolving of the curd. However, care should be taken that the suspension of curd in the water is not hot when the alkali is first added.

When the casein is completely in solution and the concentration of the caseinate is at about 20%–30% total solids, the solution is ready for pasteurization. This is effected by heating the solution to about 150° F. for thirty minutes or longer in any modern pasteurizing apparatus. The solution, now free from lumps, is of an opal to a milky shade, free from odor, of over neutralization and tastes much like a solution of good gelatin. If the caseinate is to be dried, the solution, after pasteurization, can be conducted directly either with or without addition of sugar, to the spray powder box, vacuum drum drier, or any other suitable form of milk drying apparatus. If the caseinate solution is to be preserved for a short time only this can be done by adding a suitable amount of sugar, after pasteurization, at a concentration such as is customarily used in making sweetened condensed milk.

As the alkali caseinates made according to my lacto-hydric process have their reaction in solution at the same zone of hydrogen-ion concentration as fresh cow's milk, their nutritive character is of the same order of physiological value as that of fresh milk. Furthermore, the lacto-hydric method of adding the alkali to the buffered suspension of casein prevents alkali cleavage of the loosely bound sulphur, phosphorous and nitrogen from the casein molecule, or in other words, prevents what is commonly known as alkali hydrolysis. Where such alkali hydrolysis occurs toxic products are usually produced and the resulting product is not suitable for use as a food.

My above described lacto-hydric process of making alkali caseinate is set forth and claimed in my copending application filed May 8, 1922, Serial No. 559,462.

Having available an edible alkali caseinate prepared by my lacto-hydric process or in any other suitable manner, I proceed in the preparation of the ice cream mix and the freezing of the cream as follows:

Assuming that it is desired to produce a mix containing 34% solids made up of 10% butter fat, 14% sugar and 10% other solids, I make the last item of 7% normal milk solids not fat and 3% sodium caseinate, the percentages all being by weight. I prefer, in accordance with customary practice, to add a certain amount of gelatin to the mix but with my improved composition am able to reduce the amount to three-fourths of that ordinarily used. As a concrete example, a 5000 lbs. batch of a mix of this character might consist of the following:

|  | Pounds. |
|---|---|
| 20% cream | 2500 |
| 30% evaporated skimmed milk | 600 |
| Cane sugar | 700 |
| 12.8% solution of sodium caseinate | 1180 |
| Dry gelatin | 20 |

In this particular mix the 2500 lbs. of cream furnishes 500 lbs. of butter fat and 170 lbs. of milk solids not fat.

The mix with the constituents in the proportions stated, or in other suitable proportions is made up, pasteurized, homogenized and flavored in the manner now commonly practiced in the commercial production of ice cream. At this point, however, my treatment diverges from prior practice in that the mix, after pasteurization, homogenization, cooling and the addition of flavoring material, is ready for immediate freezing, whereas heretofore with prior mixes it has been necessary, in order to secure satisfactory results, to hold the mix for a number of hours in order to "age" it. With my improved mix entirely satisfactory results are secured by freezing immediately after the preparation of the mix.

In freezing my mix I prefer to use a continuous flow of brine at a temperature ranging from 0° F. to 4° F. and a brine pressure suitable for the particular freezer use and I secure the commonly desired over-run or swell of 100% in about one-half to three-fourths of the time necessary in prior practice. Under the freezing conditions stated I find that the over-run rises during the first five minutes freezing to about 110%. At the end of ten minutes freezing it has fallen to about 100% and there holds to the end of twelve to fifteen minutes freezing (total freezing time) when it is at the maximum.

stiffness suitable for withdrawing from the freezer. In other words, the over-run is secured in the first few minutes of freezing and the mix is ready to be withdrawn from the freezer as soon as it acquires the desired stiffness and without the whipping to secure over-run following freezing, which characterized prior practice.

The short time in which the desired over-run is secured with my improved mix is due, I believe, to the fact that the alkali caseinate reduces the surface tension of the mix. This effect of the caseinate also enables a larger amount of cane sugar to be used in the mix than is otherwise feasible. In prior practice increasing the sugar content necessarily increased the surface tension of the mix and lowered the over-run attainable. Accordingly the cane sugar content usually has been kept down to about 14% to permit of the desired over-run. But with my caseinate mix the caseinate off-sets the surface tension effect of the sugar and a substantially higher sugar content is possible without sacrifice of over-run. Thus with 3% caseinate I have used as high as 18½% cane sugar and still obtained an over-run of 100%. By increasing the amount of caseinate, still larger amounts of sugar can be used, the effect of the caseinate being in proportion to its concentration in the mix.

The product made as above described is characterized by great smoothness which it maintains after prolonged cold storage. This result I believe is due to the fact that the lactose content of the cream has been reduced to such an extent that it does not crystallize out on holding in cold storage. Furthermore, this result is secured with a reduced amount of gelatin, as compared with ordinary practice, and I believe therefore that the sodium caseinate has a protective colloid effect tending to prevent or retard crystallization.

In addition to the palatability of the product, it has excellent body and food value. The protein content of the above described mix containing 7% milk solids not fat and 3% sodium caseinate would be equivalent (the entire solids totalling 34%) to an ordinary mix containing 14% milk solids not fat and 38% total solids. In thus increasing the protein content of the ice cream I bring it nearer to the improved balanced rations of Chittenden and of Rubner and Voigt. Thus in the ordinary mix with 34% total solids the balance is as follows: fat 10%, sugar 20%, protein 4.1%, whereas in my improved mix above described, the balance is: fat 10%, sugar 18%, protein 6%.

Inasmuch as aging of the caseinate mix is unnecessary in carrying out my invention, I thereby effect a substantial saving in expense incident to the labor, extra equipment and time involved in holding non-caseinate mixes at lowered temperatures during their required aging periods, and at the same time I obviate the dangers of contamination and deterioration to which non-caseinate mixes are subject because of their prolonged exposure.

The reduction in the requisite time of freezing, in my process, effects a further reduction of the expense of producing ice cream, and the ease with which a desired over-run is secured under simple freezing conditions and, if desired, with increased sugar content, is a very marked advantage possessed by my improved mix.

It is to be understood that the mix composition which I have given above is by way of illustration and for purposes of explanation and that the relative amount of alkali caseinate employed can be varied widely. However, the best results in freezing are secured by the use of a caseinate content within certain limits. Thus for a mix with 10% fat, 14% sugar and 34% total solids I have secured the desired over-run with the desired stiffness of the cream in a minimum time of freezing by the use of 2.0%–3.50% of sodium caseinate, making up the balance of the solids with normal milk solids not fat; and all things considered I have found the composition first described most satisfactory. Nevertheless, it will be understood that some of the advantages of my improved mix can be secured if the composition is not kept within the range stated. For example, in the mix specifically described above 3% sodium caseinate was used with the object of materially increasing the protein content of the mix as well as eliminating aging, shortening the freezing time and controlling the over-run, but if the amount of nutritive protein for ration-balancing purposes is not a controlling factor the other advantages enumerated can be secured by the use of considerably less caseinate. The best amount of caseinate to use in any particular mix will depend upon several factors. Thus a less amount of caseinate is required when the fat and total solids content of the mix is relatively large; whereas a larger amount of caseinate is required when the sugar content of the mix is relatively high. Generally speaking the effect of the caseinate is in proportion to the amount used and accordingly the invention is not limited to any particular proportions. It is to be observed, however, that while any lesser amount of caseinate than that specified in the example given can be used with proportionate effect, if the amount is much increased over that specified, too great an over-run is likely to result. In addition to varying the amount of caseinate used, there obviously can be variation in other respects from the procedure above described without departing from the invention as defined in the appended claims.

What I claim is:

1. As a new food product, frozen ice cream containing as principal constituents, butter fat, milk solids not fat, unhydrolized alkali caseinate, and sweetening material.

2. A liquid ice cream mix containing as principal constituents butter fat, milk solids not fat, unhydrolized alkali caseinate, and sweetening material.

3. A liquid ice cream mix containing as principal constituents, butter fat, milk solids not fat, sweetening material, and a synthetic material adapted to lower the surface tension of the mix.

4. The process of producing ice cream which comprises making a mix containing as constituents butter fat, milk solids not fat, alkali caseinate, and sweetening material and freezing the said mix without preliminary aging.

5. In the production of ice cream or the like the method of controlling the over-run which includes introducing into the mix a substance adapted to lower the surface tension of the mix.

6. In the production of ice cream or the like the method of controlling the over-run which includes introducing into the mix an alkali caseinate.

In testimony whereof, I hereunto affix my signature.

HARPER F. ZOLLER.